INVENTOR.
WESLEY O. SAUBY
BY
*Akel C. Benson*
ATTORNEY

INVENTOR.
WESLEY O. SAUBY

BY

*Thel C. Benson*

ATTORNEY

United States Patent Office 3,444,411
Patented May 13, 1969

3,444,411
EXPANSION COMPENSATING ROTOR SUPPORT
Wesley O. Sauby, Minneapolis, Minn., assignor to Electric Machinery Mfg. Company, Minneapolis, Minn., a corporation of Minnesota
Filed July 11, 1966, Ser. No. 564,243
Int. Cl. H02k 1/22
U.S. Cl. 310—266                                    5 Claims

ABSTRACT OF THE DISCLOSURE

An expansion compensating rotor support for compensating for both radial and axial expansion of the rotor and comprising an annulus attached to the rotor at circumferentially-spaced localities to form beams therebetween and a laminated disc-like structure connected to a bearing for the rotor and to said annulus at localities intermediate the points of attachment of the annulus to the rotor to compensate for axial expansion of the rotor.

---

The herein disclosed invention relates to expansion compensating rotor supports for rotating electrical machines and has for an object to provide a support by means of which both radial expansion and longitudinal expansion of the rotor of the machine may be compensated for.

Another object of the invention resides in providing a construction adapted to be used with electric machines having an eddy current ring subject to extreme heating and producing both radial and longitudinal expansion.

A still further object of the invention resides in providing an expansion compensating rotor support in which both radial and longitudinal expansion is compensated for at one end of the rotor.

In carrying out the invention an annulus is employed which is attached to the rotor at circumferentially spaced localities leaving the intermediate portions of the annulus free to flex in a radial direction and in further providing a disc-like structure connected to the annulus and at circumferentially spaced intervals located at positions intermediate the positions of attachment of the annulus to the rotor.

Another object of the invention resides in making the disc-like structure laminated to permit of yieldably moving in an axial direction.

Other objects of the invention reside in the novel combination and arrangement of parts and in the details of construction hereinafter illustrated and/or described.

Figure 1:
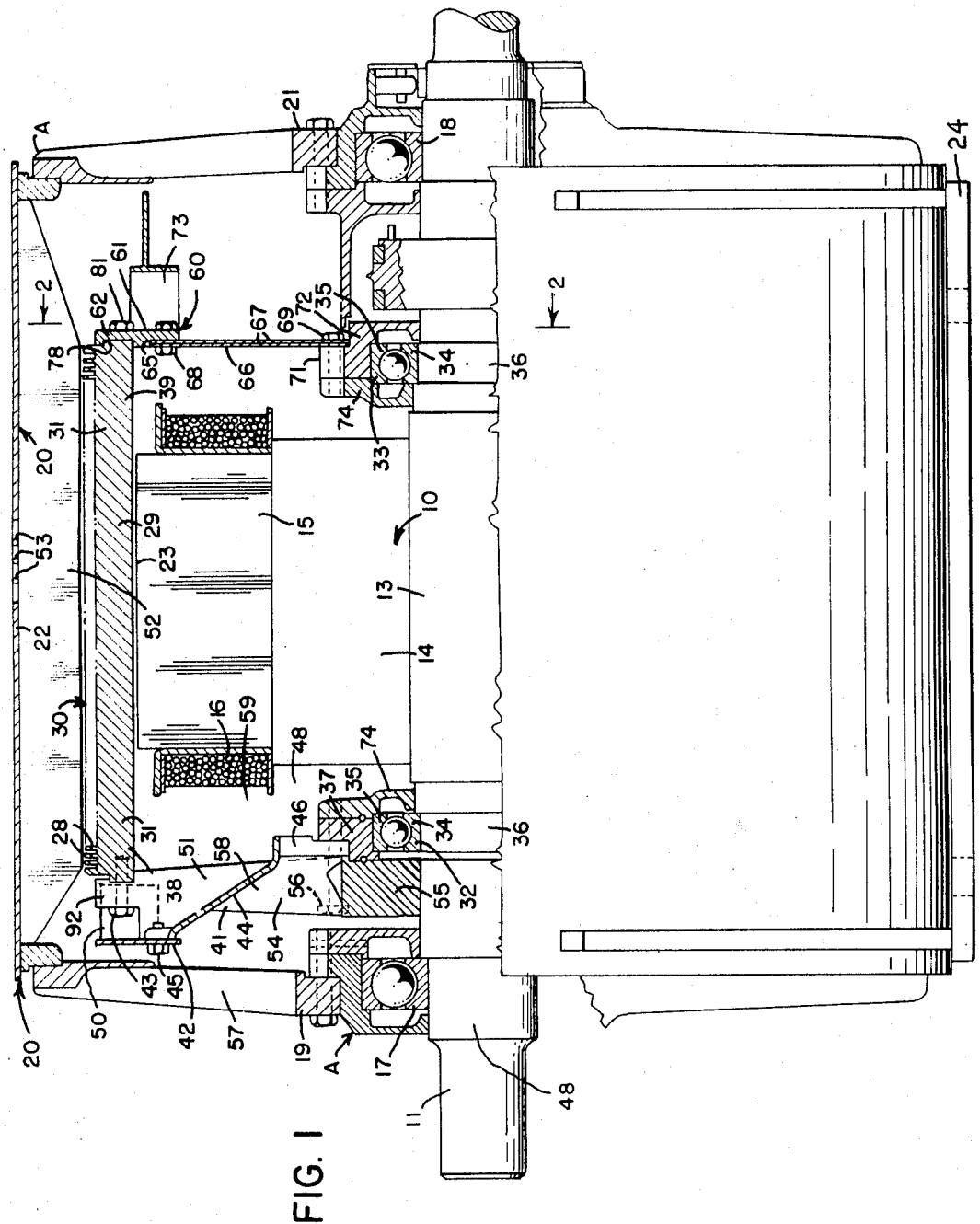
FIGURE 1 is an elevational sectional view of a portion of a magnetic drive illustrating an embodiment of the invention applied thereto and taken on line 1—1 of FIGURE 2.

For the purpose of explaining the invention a portion of a magnetic drive has been illustrated and which is indicated in its entirety by the reference character A. This drive has two rotors 10 and 30 separated by an air gap 23 and which are constructed as follows and which are supported in a housing B. This housing comprises end frame members 19 and 21 which are secured to a base 24. Attached to said frame members is a hood 22 completing the housing B.

The rotor 10 is mounted on a shaft 13 and is rigidly attached thereto. This rotor comprises a spider 14 having magnetic salient poles 15 mounted thereon. Wound on the poles 15 are coils 16. The shaft 13 is journaled in a bearing 18 which is supported in the end frame member 21.

The rotor 30 consists of an eddy current ring 29 having a solid ferrous section 31 with annular fins 28 extending outwardly therefrom. The rotor 30 is attached to a spider 41 which has a hub 55 secured to a shaft 48. This shaft is coaxial with reference to shaft 13 and is journaled in a bearing 17 mounted in the end frame member 19. Mounted on shaft 13 between the spider 41 and bearing 18 are bearings 32 and 33 which have inner races 34 and outer races 35. The races 34 are mounted on reduced portions 36 of shaft 13. Clamp rings 37 and 72 encircling shaft 13 and rotatable thereon engage said outer races on one side thereof and other clamp rings 74 engage said races on the other side thereof. Screws 56 and 69 extending through said clamp rings clamp the outer races 35 thereto. The end 38 of ring 29 is mounted for rotation relative to shaft 13 by means of bearing 32, while the end 39 of said ring is mounted for rotation with respect to shaft 13 by means of bearing 33 which later construction embodies the instant invention.

The spider 41 as previously stated is mounted on shaft 48 and has arms 54 issuing outwardly therefrom. These arms are attached to the end 38 of ring 29 by means of a number of screws 43.

Issuing axially from the spider 41 is a conical baffle 44 which is cast integral therewith. This baffle has a central opening 46 encircling the bearing 32. An annular ring 42 is attached to arms 54 by means of screws 45 which ring serves as an extension of baffle 44. The annular ring 42 is provided with fan blades 50 which with rotation of the rotor 30 causes air to be discharged into the space 52 between the eddy curent ring 29 and the hood 22. Openings 53 in said hood discharge the heated air therefrom. The end frame 19 has openings 57 in the same and through which air may pass into the spaces 58 within the baffle 44 and directed through the openings 46 in said baffle between arms 51 and into the space 59 within the interior of the housing 20. From this locality the air travels into the space 52 between the eddy current ring 29 of rotor 30 and hood 22 and is discharged from the said housing through the openings 53 in hood 22. The end 39 of the rotor 30 also has blades 73 discharging air into space 52 which are supported as will be presently described.

The expansion compensating rotor support constituting the instant invention is indicated by the reference numeral 60 in the drawings. This support consists of an annulus 61 which has lugs 62 extending outwardly from the same at equally circumferentially spaced localities said annulus being bolted to the ferrous section 31 of the ring 29 by means of screws 81. The material of the annulus 61 may be of brass, steel, or other suitable bendable material and the parts between lugs 62 serve as bendable beams with the portions 63 thereof intermediate the lugs 62 free from rotor 30 and adapted to remain substantially fixed when the outer portions 64 adjacent said lugs are moved outwardly through the expansion of the ring 29. The outermost portions of the lugs 62 are formed with rabbets 76 which fit against an annular shoulder 78 on the ring 29.

Figure 2:
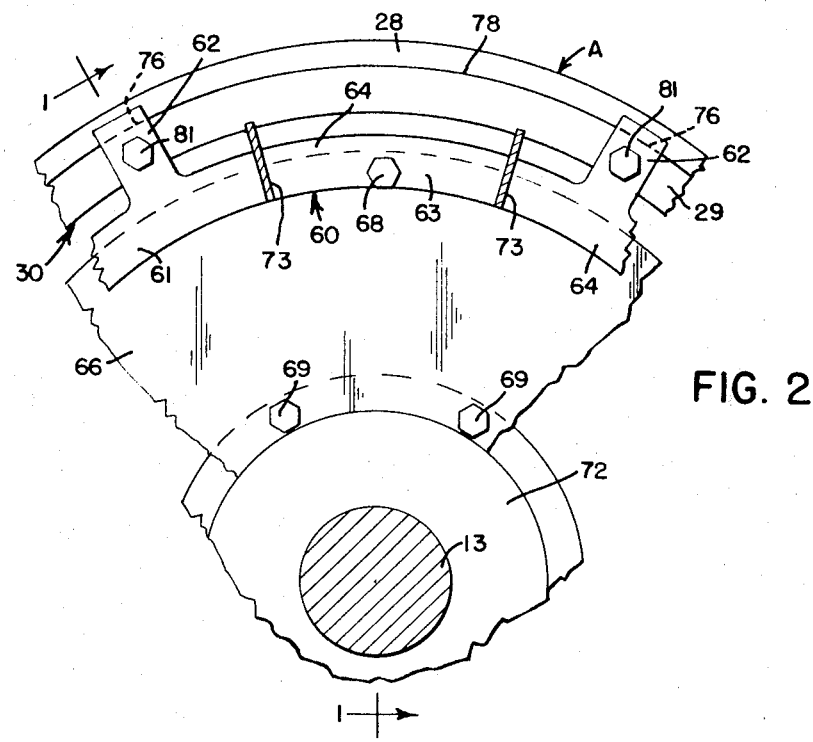
FIGURE 2 is a fragmentary sectional view taken on line 2—2 of FIGURE 1 and showing the relation of the parts when the rotor is cool.

The inner circumferential portion of the annulus 61 is formed with an annular rabbet 65. In this rabbet is received a disc structure 66 provided with a number of leaves 67 lying adacent one another and forming a laminated construction. Bolts 68 extend through the annulus 61 and the outer marginal portion of the disc structure 66 and clamp the same to the annulus. There are as many bolts 68 as screws 81 and they are located circumferentially intermediate said screws as shown in FIGURE 2. Screws 69 extend through the innermost portion of the disc structure 66 and through the clamp ring 72 and are screwed into the clamp ring 74 and attach the disc structure to said clamp ring. The inner portions of the disc structure 66 being bolted to the clamp members 72 and 74, the bearing 33 supports the end 39 of the rotor 30 for rotary movement. The blades 73 previously referred to may be attached to the annulus 61 if desired.

The operation of the invention is as follows:

When the eddy current ring 29 becomes heated, radial expansion occurs and also axial expansion. The bearings 32 and 33 are fixed relative to the shaft 13 and axial expansion of the ring 30 would produce undue strain on said bearings if rigid means were employed to support said ring on the outer races of said bearings. While sliding connection between the eddy current ring and the shaft or bearings could be used, such connections would be undesirable since the play might be enough to modify the air gap which with a variable speed magnetic drive is quite small and noise and mechanical unbalance would result. The laminated disc structure was hence adopted. However, by attaching the laminated structure directly to the eddy current ring the radial expansion was too severe on the disc structure and distortion and injury to the disc structure and at the points of attachment occurred. This again would affect the air gap and cause trouble. To overcome the disadvantages of the single connection of the disc structure in this application was conceived.

Figure 3:
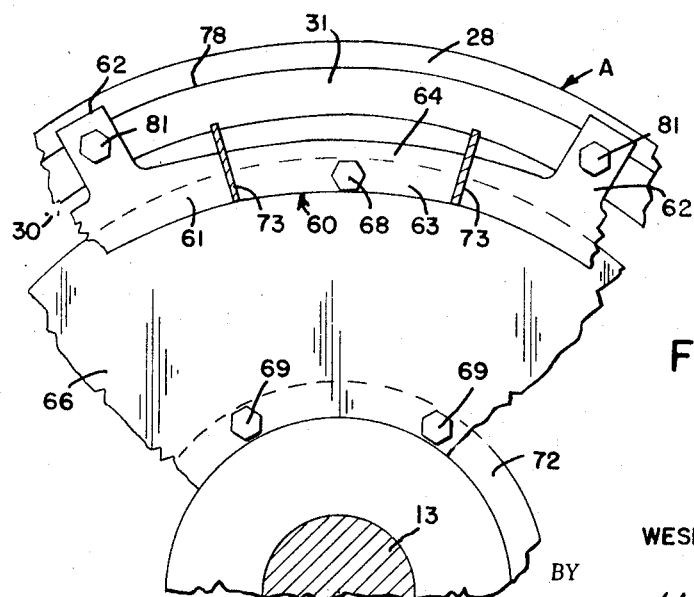
FIGURE 3 is a view similar to FIGURE 2 showing the relation of the parts when the rotor is hot.

When the eddy current ring 29 expands radially through high heat being generated through eddy current flowing in it, the portions of the ring to which the annulus is attached move outwardly radially, the circular distance between said points increasing in length. Since the annulus is connected to the ring 30 by means of lugs 62 said annulus is not subject to the same increase in temperature as the ring and the circular dimension of the annulus is not correspondingly increased. This causes the intervening portion of the annulus between the attaching members to become partially straightened out as shown in FIGURE 3. By properly designing the annulus 61, the locations of the points of attachment of said annulus to the disc-like structure 66 can be made to remain substantially fixed relative to the disc-like structure whereby less stress is placed upon the same. It has been found that if the annulus be constructed in accordance with the formula $$\frac{N^2 D}{R} = 4.77$$

that highly desirable results are obtained. In the formula, N represents the number of points of attachment to the rotor, D is the radial depth of the annulus and R is the mean radius of the annulus.

The advantages of the invention are manifest. Less stress results in the supporting structure as the rotor expands. No sliding parts are required making it possible to rigidly attach the rotor to the races of the bearings mounted on the shaft or to other structure carried by the shaft. Compensation for both radial and longitudinal expansion is had at one end of the rotor.

Changes in the specific form of the invention, as herein described, may be made within the scope of what is claimed without departing from the spirit of the invention.

Having described the invention, what is claimed as new and desired to be protected by Letters Patent is:

1. In a rotating electrical machine having a rotor subject to heating and rotatable in bearings, the members of which are restrained from axial movement, the combination of an expansion compensating support comprising:
    (a) a plate-like annulus of radially yieldable material disposed adjacent one end of said rotor,
    (b) fastening members between said annulus and rotor,
    (c) said fastening members being spaced circumferentially from one other,
    (d) a disc-like structure of transversely yieldable material,
    (e) fastening members between said disc-like structure and said annulus spaced circumferentially and disposed between the first named fastening members,
    (f) said annulus between said first named fastening members being free from said rotor to permit relative radial movement therebetween,
    (g) means for attaching said disc to one of the bearings, and
    (h) means for supporting the other end of said rotor for rotation by another of said bearings.

2. An expansion compensating rotor support according to claim 1 in which:
    (a) said annulus lies inwardly of the rotor to which it is attached,
    (b) lugs on said annulus extending outwardly therefrom and overlying said rotor,
    (c) said fastening members between the rotor and annulus extending through said lugs.

3. An expansion compensating rotor support in accordance with claim 1 in which:
    (a) the parts are designed in accordance with the formula $$\frac{N^2 D}{R} = 4.77$$

in which
    (b) N represents the number of points of attachment of the annulus to the rotor or disc-like structure,
    (c) D is the radial depth of the annulus, and
    (d) R is the mean radius of the annulus.

4. An expansion compensating rotor support according to claim 1 in which:
    (a) The disc-like structure consists of laminated sheets of bendable metal.

5. An expansion compensating rotor support according to claim 2 in which:
    (a) the annulus and lugs form bendable beams yieldable to compensate for radial expansion of the rotor.

References Cited

UNITED STATES PATENTS

| | | | |
|---|---|---|---|
| 1,093,149 | 4/1914 | Schneider | 310—67 |
| 1,844,710 | 2/1932 | Wood | 310—261 |
| 2,864,016 | 12/1958 | Waltscheff | 310—126 X |

FOREIGN PATENTS

| | | |
|---|---|---|
| 185,269 | 9/1922 | Great Britain. |

MILTON O. HIRSHFIELD, *Primary Examiner.*

E. SUTTON, *Assistant Examiner.*